April 20, 1937.  E. S. CORNELL, JR  2,078,195
METHOD OF MANUFACTURING WROUGHT NONFERROUS PIPE FITTINGS
Filed Dec. 1, 1934   4 Sheets-Sheet 1
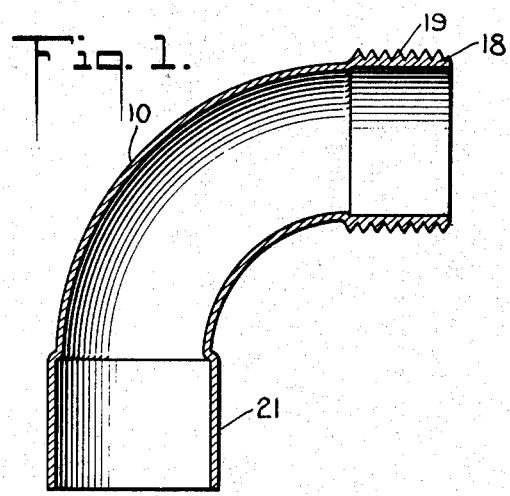
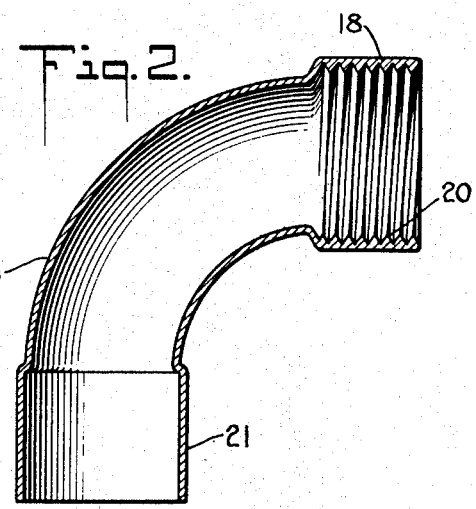
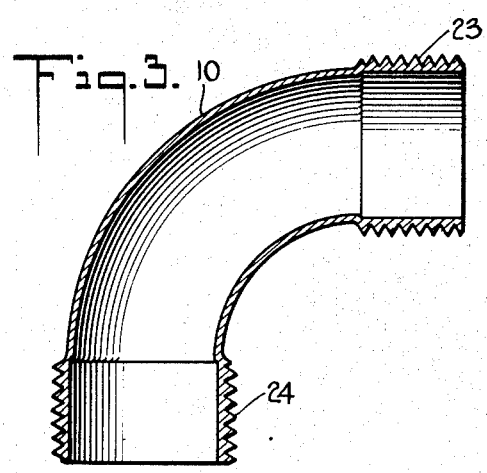
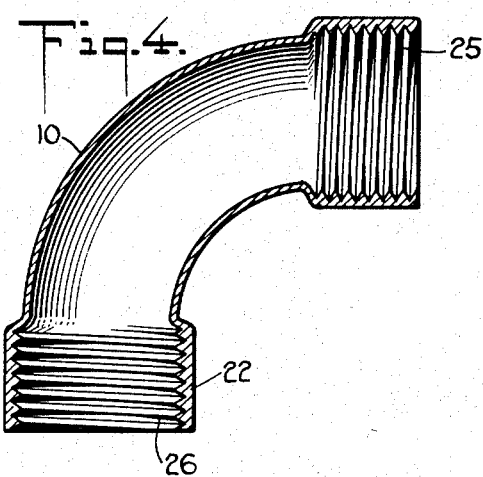
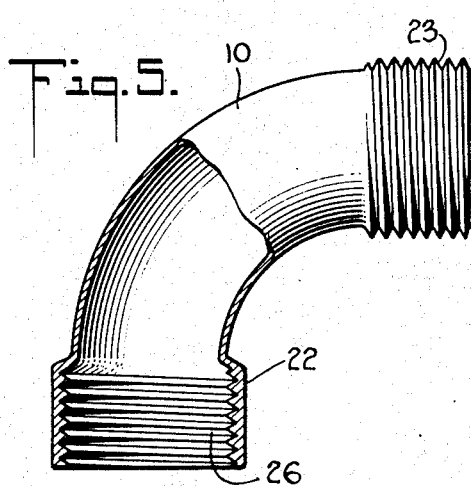
INVENTOR
Edward S. Cornell, Jr.
BY
Henry J. Locke
HIS ATTORNEY April 20, 1937.  E. S. CORNELL, JR  2,078,195
METHOD OF MANUFACTURING WROUGHT NONFERROUS PIPE FITTINGS
Filed Dec. 1, 1934  4 Sheets-Sheet 2
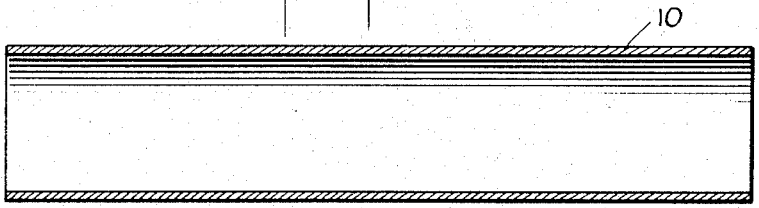
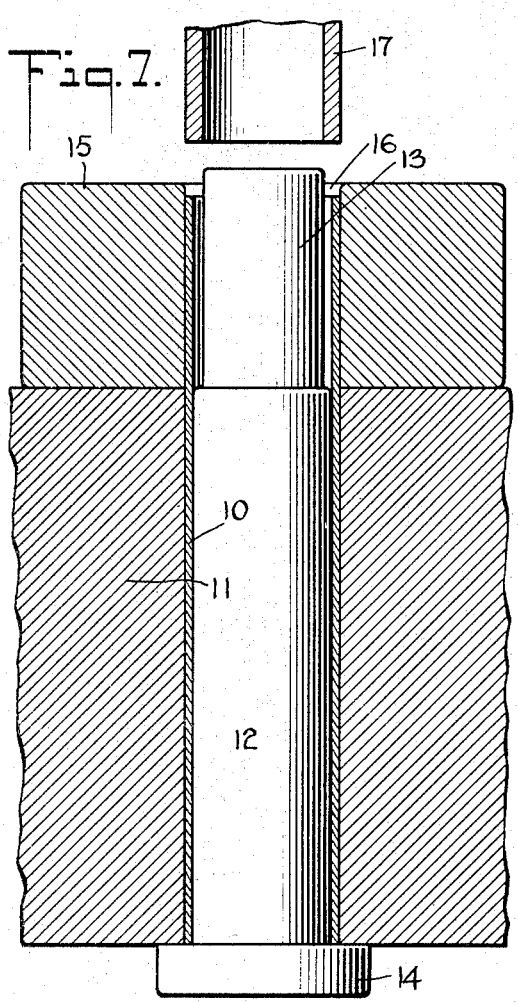
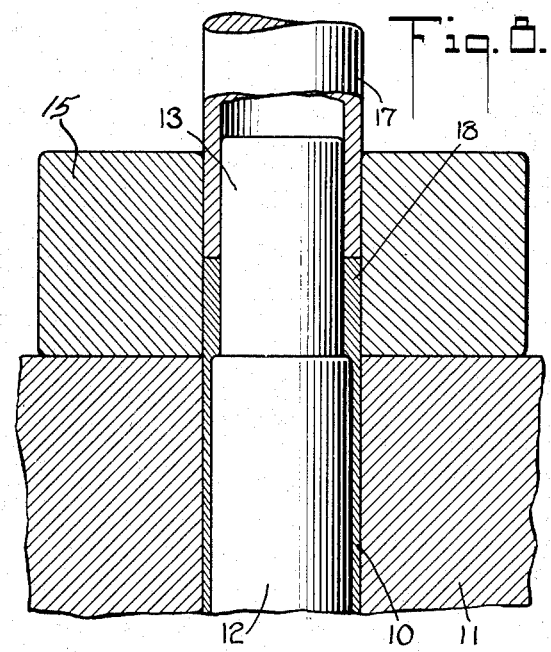
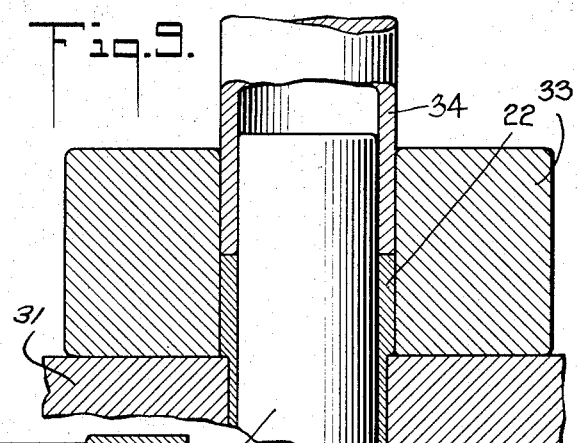
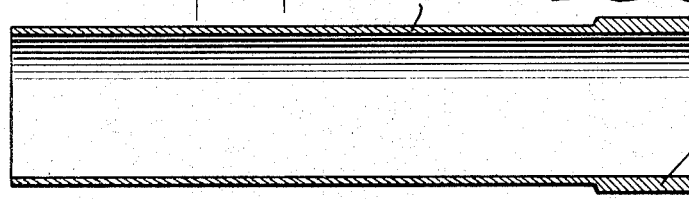
INVENTOR
Edward S. Cornell, Jr.
BY
HIS ATTORNEY

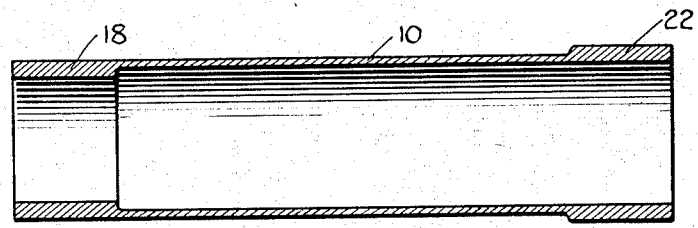
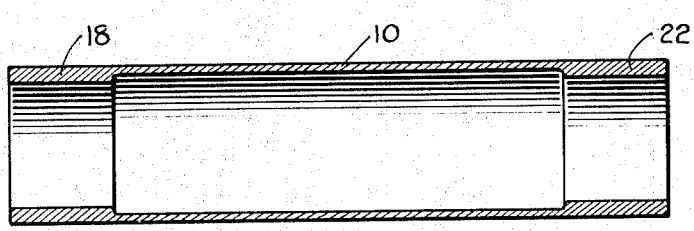
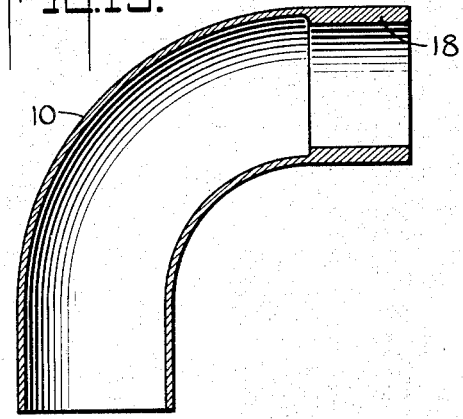
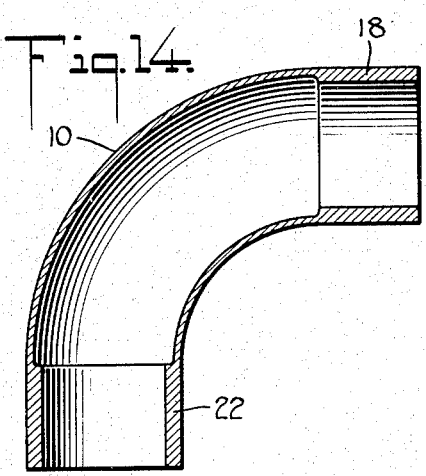
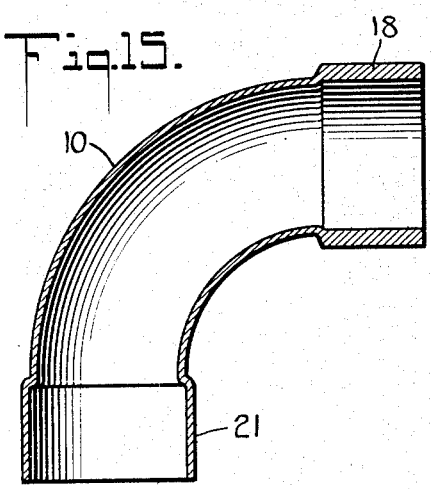
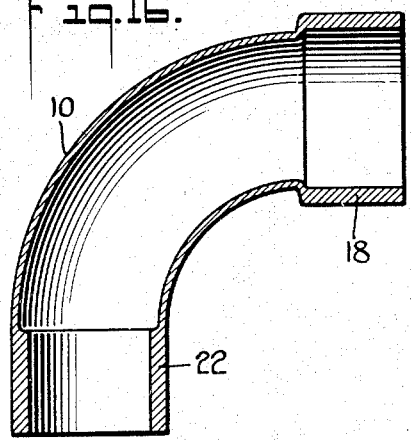

April 20, 1937. E. S. CORNELL, JR 2,078,195
METHOD OF MANUFACTURING WROUGHT NONFERROUS PIPE FITTINGS
Filed Dec. 1, 1934 4 Sheets-Sheet 4
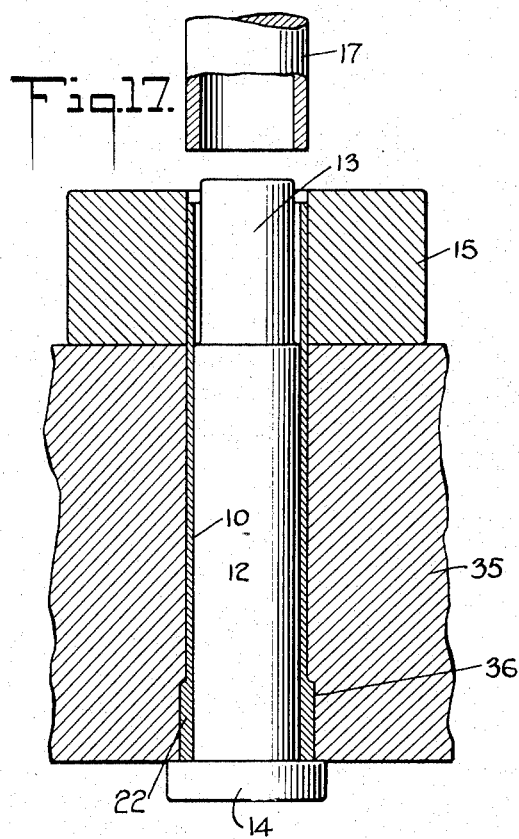
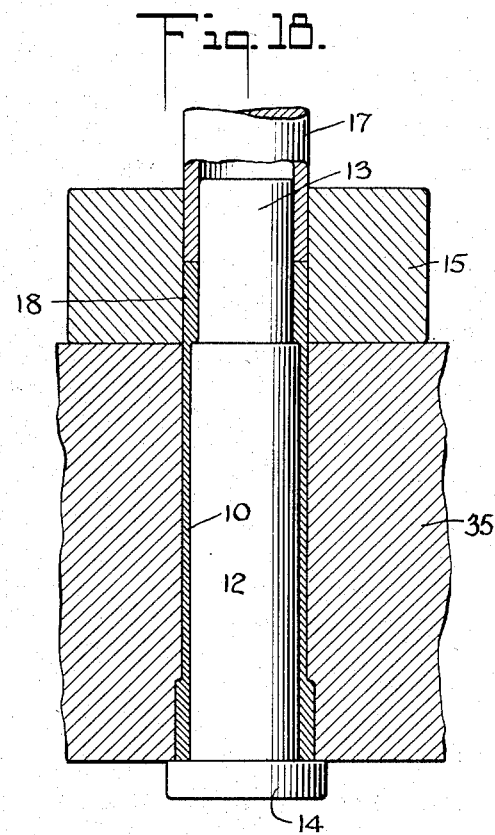
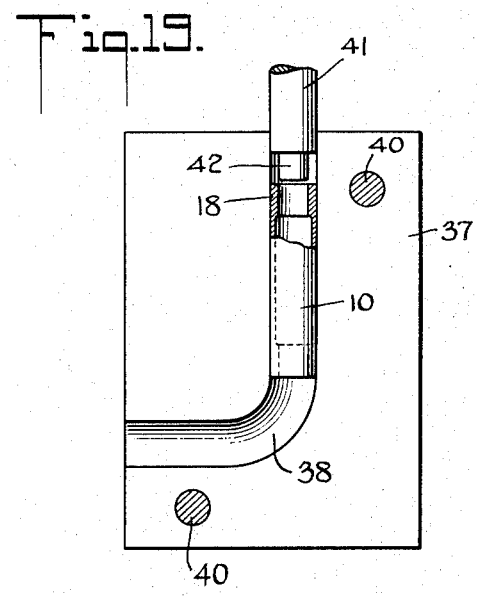
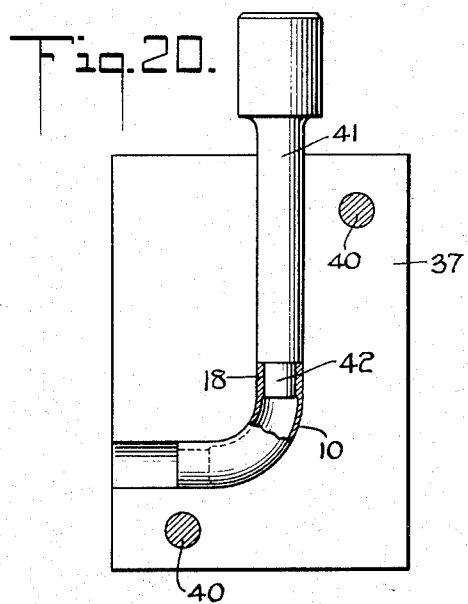
INVENTOR
Edward S. Cornell, Jr.
BY
HIS ATTORNEY Patented Apr. 20, 1937

2,078,195

UNITED STATES PATENT OFFICE 2,078,195

METHOD OF MANUFACTURING WROUGHT NONFERROUS PIPE FITTINGS

Edward S. Cornell, Jr., Larchmont, N. Y., assignor to American Radiator Company, New York, N. Y., a corporation of New Jersey Application December 1, 1934, Serial No. 755,567

5 Claims. (Cl. 29—157)

My present invention relates to pipe fittings, and more particularly to an improved method of manufacturing pipe fittings, such as elbows, from wrought non-ferrous metal having a body wall thickness insufficient to bear threads, and in which the resulting pipe fitting may be provided with threaded ends.

In my copending application, Serial # 750,644 filed October 30, 1934, entitled Elbow and kindred pipe fittings, I have described and claimed one form of the improved product resulting from practising the improved method of my present invention.

Pursuant to my present invention I have overcome the defects of fittings produced by prior methods of manufacture by costly forging and am enabled to manufacture a pipe fitting, such as an elbow or the like, out of wrought, non-ferrous metal, such as copper, having a body wall thickness insufficient to bear threads, and having thickened ends which not only safely bear threads, but which have a safe wall thickness substantially equal to, and if desired exceeding, the wall thickness of the remainder of the fitting.

An object of my invention therefore is an improved method of making pipe fittings, such as elbows.

The problem of producing a fitting according to my present invention is complicated because of the fact that a number of types of ends are required to suit varying conditions met with in practice. For example, a fitting, such as an elbow, may be desired, having on one end male threads, and the other devoid of threads and smooth for engagement with either the interior or exterior an end of a pipe or other fitting.

There may be desired a fitting such as an elbow, having at one end internal threads adapted to be engaged by the external threads of an end of a pipe or fitting, and the other end being devoid of threads and smooth and adapted to be engaged by and make a sweat joint connection with either the interior or exterior face of an end of pipe or other fitting.

There may be desired an elbow in which both ends are provided with exterior threads.

There may be desired a pipe fitting in which both ends are provided with interior threads; or there may be desired a pipe fitting, such as an elbow, in which one end is provided with exterior threads and the other end provided with interior threads.

The above are the illustrative examples of pipe fittings of this character, specifically elbows, and which come within the range of my present invention.

In the accompanying drawings illustrating various embodiments of my invention applicable to fittings exemplify various steps of my method according to my present invention;

Fig. 1 is a sectional elevation of an elbow provided with exterior threads at one end, and with a smooth portion at the other end.

Fig. 2 is a sectional elevation of an elbow provided with interior threads at one end, and with a smooth portion at the other end.

Fig. 3 is a vertical section of an elbow provided with exterior threads on each end.

Fig. 4 is a sectional elevation of an elbow provided with interior threads on each end.

Fig. 5 is an elevation, partially in section, of an elbow having exterior threads at one end and interior threads at the other end.

Fig. 6 is a sectional elevation of a length of tubing from which the various forms of elbow shown in Figs. 1 to 5 may be produced.

Fig. 7 is a sectional elevation through a die and plunger showing the first step in the method of thickening one end of the tube shown in Fig. 6.

Fig. 8 is a section, similar to a portion of Fig. 7, and illustrating the position of the parts after the end thickening operation has been performed.

Fig. 9 is a section of a die and punch showing the step of thickening one end of the tube shown in Fig. 6.

Fig. 10 is a section of the tube shown in Fig. 9.

Fig. 11 is a sectional elevation of the tube illustrated in Fig. 6 at a stage succeeding the step of thickening the ends thereof according to the operation of the devices shown in Figs. 8 and 9.

Fig. 12 is a sectional elevation of the tube shown in Fig. 11, at a stage succeeding the step of moving the thickened end on the outside of the tube shown in Fig. 11, into the inside of the tube, and preparatory to bending the tube into angular form to form an elbow.

Fig. 13 is a sectional elevation of an elbow formed from a tube, such as the tube shown in Fig. 6, at a stage succeeding the thickening of the end according to the construction shown in Fig. 8.

Fig. 14 is a sectional elevation of an elbow made from the tubular construction shown in Fig. 12.

Fig. 15 is a sectional elevation of the elbow shown in Fig. 13, after the thickened end portion thereof has been expanded to a position on the outside of the elbow, and after the unthickened end thereof has been expanded to form a smooth portion for the reception of a tube or other fitting.

Fig. 16 is a sectional elevation of an elbow made from the elbow construction shown in Fig. 14 and wherein one of the thickened ends has been expanded to a position on the outside thereof; and Fig. 17 is a sectional elevation through a die and plunger and illustrating the first step in thickening the normal tube end of the tube shown in Fig. 10.

Fig. 18 is a view similar to Fig. 17 and showing the operation initiated in Fig. 17, completed.

Fig. 19 is a plan view of a section of an arcuate die and with an interiorly thickened end tube such as shown in Fig. 12 in position therein preparatory to being bent into arcuate form; and Fig. 20 is a view similar to Fig. 19, but showing the position of the tubular member after being moved into position to complete the bend therein.

Referring to the drawings, see Fig. 6, I preferably utilize a length of tube 10 of any suitable diameter and length, and ordinarily having a wall thickness insufficient to bear threads thereon or therein, the tube 10 being preferably of wrought, homogeneous, non-ferrous metal such as copper. As a first step in the manufacture of an elbow from the length of tube 10, to be provided at one or both ends thereof with threads, I place such length of tube 10 in a cavity in a die block 11, see Fig. 7, one end of the tube extending upward beyond the upper limit of such die block 11. I then insert into the interior of such tube 10 a mandrel having a body 12, a reduced upper end 13, and an enlarged lower end or head 14.

The length of the body portion 12 of the mandrel is substantially equal to the height of the die block 11 and the length of the reduced portion 13 is longer than the portion of the tube 10 which extends upward beyond the upper face of the die block 11. Resting on the upper face of the die block 11 is a collar 15, this collar being provided with a perforation 16 of a diameter substantially equal to the outer diameter of the tube 10. The thickness of the collar 15 is slightly greater than the length of the end of the tube 10 which extends above the upper face of the die block 11. A hollow punch 17 having an external diameter substantially equal to the diameter of the tube 10 or the diameter of the hole 16 in the collar 15, and an internal diameter but slightly greater than the external diameter of the reduced portion 13 of the mandrel is carried by the ram (not shown) of a suitable punch press or equivalent.

The die block 11, collar 15 and mandrel are placed in the position shown in Fig. 7, in such punch press or equivalent machine, and the plunger 17 is forced downwardly into the annular space between the walls of the hole 16 of the collar 15 and the reduced end 13 of the mandrel. Under pressure there is produced a cold flow of the homogeneous, non-ferrous metal of the treated end of the tube 10, and when the plunger 17 reaches its lowermost position as shown in Fig. 8, there is produced on the treated end of the tube 10 and on the interior thereof a thickened wall end 18, see Fig. 8. During this operation that portion of the tube 10 in the die block 11 and in engagement with the body 12 of the mandrel will be protected against deformation.

The resultant construction is therefore a tube of which one end is thickened and in which the tube throughout the remainder of its entire length, i. e., its body portion, is maintained of relatively constant diameter. Such tube is adapted for use pursuant to my invention in the production of an elbow of the type shown in Figs. 1 and 2, or of the type shown in Fig. 13 in an intermediate form.

The product resulting from the process as just described with respect to Figs. 7 and 8 is now made into elbow form, as shown in Fig. 13, in accordance with the teaching of my improved invention described and claimed in my Patent No. 2,002,470, dated May 21, 1935, entitled Method of making elbow pipe fittings of integral tubular metal.

The product, resulting from such elbow forming process as indicated in Fig. 13, comprises a thickened end 18 having an outer diameter equal to the outer diameter of the tube 10, and its other end smooth, and that the body of the elbow is of constant diameter throughout its length. The construction shown in Fig. 13 is now placed in a holding device, and a punch or mandrel or other suitable device is forcibly inserted into the thickened end 18 of the elbow to expand such thickened end in diameter and thus transfer the thickened portion from the inside of the end of the tube portion 10 to the outside thereof. Such expanding operation is continued until the inner diameter of the displaced thickened portion 18 is slightly greater than the inner diameter of the body of the tube 10 as shown in Fig. 15.

There is then formed on the thickened end 18 the external threads 19 to derive the fitting illustrated in Fig. 1.

If it is desired to have internal threads on such thickened end of the elbow, such thickened end 18 is expanded to a greater degree than is indicated in Fig. 15, and internal threads 20 are cut on the interior thereof, resulting in the elbow illustrated in Fig. 2. The degree of expansion is such that when a pipe or other pipe fitting is screwed into the internal threads 20, the internal diameter of the pipe (not shown), or other pipe fitting, is substantially equal to the internal diameter of the body of the elbow.

After the operation on such thickened end 18 of the elbow as indicated in Figs. 1, 2 and 13, the other end if desired may be expanded as indicated by the reference numeral 21 in Figs. 1 and 2, and which end 21 may be smooth, to afford a sweat joint connection with the end of a pipe or pipe fitting.

Where it is desired to have an internal or external thread on one or both ends of the elbow, the tube 10 may first be subjected to an operation illustrated in Fig. 9, to produce a thickened end 22 having an inner diameter of the body of the tube 10, and an outer diameter exceeding the body of the tube, as indicated in Fig. 10.

Referring to Fig. 9, there is shown the die block 31, similar to the die block 11 in Fig. 7, provided with a cavity for receiving the length of the tube 10. Associated with the die block 31, and extending through the tube 10, is a mandrel 32, the diameter of which is uniform throughout and but slightly less than the inner diameter of the tube 10. Associated with the mandrel 32 and the die block 31, is a collar 33, having a hole therethrough but slightly greater than the desired outer diameter of the thickened end 22 to be produced on the treated end of the tube 10. Associated with the mandrel 32 and collar 33 is a hollow punch 34, which, moving downwardly, as viewed in Fig. 9, causes a cold flow of the material of the treated end of the tube 10, into the form designated by the reference numeral 22.

The structure resulting from the above sequence of operations is shown in Fig. 10, wherein the thickened end 22 is of a larger diameter than the outer diameter of the body of such tube 10. The structure shown in Fig. 10 is then placed in a die block 35 having a recess 36 in the bottom thereof sufficient to house the enlargement 22 after which the mandrel comprising the body portion 12, reduced end 13 and enlarged bottom or head portion 14 is placed in the position shown in Fig. 17. The collar 15 is placed in position about the upper protruding end of the tube 10 and concentric with the reduced portion 13 of the mandrel. The plunger 17 is then moved from the position shown in Fig. 17 to the position shown in Fig. 18 producing thereby the thickened end 18 on the upper end of the tube 10, the outer diameter of which thickened end is substantially equal to the outer diameter of the now intermediate portion of the tube 10.

There results from the plurality of operations just described, the structure shown in Fig. 11, which figure shows the thickened end 18 of an outer diameter substantially equal to the intermediate portion i. e., body of the tube 10 and on the other end the thickened end 22 of a greater outside diameter than the outer diameter of the intermediate portion i. e., body of the tube 10. Also, the intermediate i. e., body portion has a wall thickness insufficient to bear threads. The structure shown in Fig. 11 is then placed on a mandrel having an outer diameter substantially equal to the inner diameter of the thickened end 18 and the assembly is then forced through the perforation or hole in a die block (not shown) similar to the die block 11 of Figs. 7 and 8, producing thereby the structure shown in Fig. 12, where it will be noted that the thickened end 22 as well as the end 18 has an outer diameter substantially equal to the intermediate i. e. body portion of the tube 10.

Utilizing the structure shown in Fig. 12, the same is forced through an arcuate passage in a die block in the manner set forth in my aforesaid Patent No. 2,002,470. The operation just referred to is more clearly shown in Figures 19 and 20 where 37 designates a die block provided with the arcuate passage 38 therein. The die block 37 constitutes one-half of the entire die block structure, the other half of the structure having been removed to better illustrate the construction of the arcuate passage 38 therein. The structure such as is shown in Fig. 12 is then placed in one arm of the arcuate passage 38 as shown in Fig. 19 and the other half (not shown) of the die block structure is placed on the member 37 and the two edges secured together by means of the bolts 40. A punch 41 having its lower end 42 of reduced diameter sufficient to be a sliding fit on the end 18 is moved downwardly, forcing the tube 10 with the interiorly enlarged ends 18 and 22 and as shown in Fig. 12 into the position illustrated in Fig. 20. There results therefrom the structure shown in Fig. 14 which, as will be noted, is an elbow whereof the thickness of its body portion 10 is insufficient to bear threads and the thickened ends 18 and 22 have an outer diameter substantially equal to the diameter of the body portion. The structure shown in Fig. 14 is now further operated on by subjecting the ends 18 and 22 to an expanding operation to produce a structure in which the inner diameter of the thickened ends 18 and 22 is slightly larger than the inner diameter of the body portion of the elbow, namely, the structure shown in Fig. 3, where the expanded thickened ends 18 and 22 have been threaded to provide the external threads 23 and 24 respectively cut thereon.

Should it be desired to cut internal threads on both of such thickened ends 18 and 22 such thickened ends are further expanded and the internal threads 25 and 26 are then cut on the interior of the expanded thickened ends 18 and 22 respectively, resulting in a construction such as is shown in Fig. 4.

To produce the type of elbow shown in Fig. 5, one of the thickened ends, say the end 18, is expanded sufficiently to allow the external threads 23 to be cut thereon as shown in Figs. 3 and 5, and the thickened end 22 is expanded to a greater extent to allow the internal threads 26 to be cut thereon, as indicated in Figs. 4 and 5.

As appears from the above, the various embodiments of my fittings provide for thickening at one or both ends and threads at such thickened end or ends of any fitting, the diameter of the outer and inner faces of each end of any particular fitting may be selected for connection with an end of a pipe or other pipe fitting to provide for unobstructed flow of fluid when the fitting is assembled with a pipe or fitting.

There results from my improved method, a pipe fitting, such as an elbow, of wrought, homogeneous, preferably nonferrous metal, such as copper, in which the main or body portion thereof has a wall thickness insufficient to bear threads, and in which the thickened ends thereof are of sufficient thickness to bear either internal or external threads, and have sufficient metal between the bottoms of the threads and the internal or external diameters thereof respectively, to be substantially equal to the wall thickness of the main or body portion.

Whereas I have described my invention by reference to specific forms thereof, it will be understood that many changes and modifications may be made without departing from the spirit of the invention.

I claim:

1. That improved method of manufacturing pipe fittings such as elbows from integral wrought, homogeneous, non-ferrous metal, which comprises utilizing a length of tube of a wall thickness insufficient to bear threads, thickening one end thereof, the external diameter of the thickened end being substantially equal to the outer diameter of the tube, bending the length of tubing, including the thickened end, by forcing the tube through an arcuate die to form an elbow, expanding the thickened end to increase its internal diameter of the tube and cutting threads thereon.

2. That improved method of manufacturing pipe fittings such as elbows from integral wrought, homogeneous, non-ferrous metal which comprises utilizing a length of tube of a wall thickness insufficient to bear threads, thickening one end thereof, the external diameter of the thickened end being substantially equal to the outer diameter of the tube, bending the length of tubing, including the thickened end, by forcing the tubing through an arcuate die to form an elbow, expanding the thickened end to increase its internal diameter to a diameter substantially equal to the internal diameter of the tube, and cutting threads therein.

3. That improved method of manufacturing an elbow from integral wrought, homogeneous, non-ferrous metal which comprises utilizing a tube of a desired length and having a wall thickness insufficient to bear threads, forming at one end a thickened portion from the material of the tube and of an outer diameter greater than the outer diameter of the tube, forming on the opposite end a thickened portion having an outer diameter equal to the outer diameter of the tube while supporting the tube internally by a mandrel, reforming the first said thickened end to reduce its outer diameter to an outer diameter substantially equal to the outer diameter of the tube while supporting the tube internally by a mandrel, bending the resulting structure into elbow form by forcing the same through an arcuate die, then subjecting the thickened ends to an expanding operation and cutting threads on the outer diameters thereof.

4. That improved method of manufacturing an elbow from integral wrought, homogeneous, non-ferrous metal which comprises utilizing a tube of a desired length and having a wall thickness insufficient to bear threads, forming at one end a thickened portion from the material of the tube and of an outer diameter greater than the outer diameter of the tube, forming on the opposite end a thickened portion having an outer diameter equal to the outer diameter of the tube while supporting the tube internally by a mandrel, reforming the first said thickened end to reduce its outer diameter to an outer diameter substantially equal to the outer diameter of the tube by supporting the tube internally by a mandrel, bending the resulting structure into elbow form by forcing the same through an arcuate die, and then subjecting the thickened ends to an expanding operation and cutting threads on the inner diameters thereof.

5. That improved method of manufacturing an elbow from integral wrought, homogeneous, non-ferrous metal which comprises utilizing a tube of a desired length and having a wall thickness insufficient to bear threads, forming at one end a thickened portion from the material of the tube and of an outer diameter greater than the outer diameter of the tube, forming on the opposite end a thickened portion having an outer diameter equal to the outer diameter of the tube by supporting the tube internally by a mandrel, reforming the first said thickened end to reduce its outer diameter to an outer diameter substantially equal to the outer diameter of the tube while supporting the tube internally by a mandrel, bending the resulting structure into elbow form by forcing the same through an arcuate die, subjecting the thickened ends to an expanding operation, and cutting threads on the external diameter of one of such thickened ends and a thread on the internal diameter of the opposite end.

EDWARD S. CORNELL, Jr.